United States Patent
Rawlings et al.

(10) Patent No.: US 7,400,933 B2
(45) Date of Patent: Jul. 15, 2008

(54) SISO MODEL PREDICTIVE CONTROLLER

(75) Inventors: James B. Rawlings, Madison, WI (US);
Gabriele Pannocchia, Livorno (IT);
Nabil Laachi, Casablanca (MA)

(73) Assignee: Wisconsin Alumni Research Foundation, Madison, WI (US)

( * ) Notice: Subject to any disclaimer, the term of this patent is extended or adjusted under 35 U.S.C. 154(b) by 282 days.

(21) Appl. No.: 11/051,814

(22) Filed: Feb. 4, 2005

(65) Prior Publication Data

US 2005/0209714 A1    Sep. 22, 2005

Related U.S. Application Data

(60) Provisional application No. 60/542,805, filed on Feb. 6, 2004.

(51) Int. Cl.
*G05B 13/02* (2006.01)

(52) U.S. Cl. .............................. 700/28; 700/29; 700/37; 700/44; 700/45; 700/47; 700/51; 700/52; 700/54

(58) Field of Classification Search ............. 700/28–29, 700/37, 44–45, 47, 51–52, 54
See application file for complete search history.

(56) References Cited

U.S. PATENT DOCUMENTS

| | | | |
|---|---|---|---|
| 6,360,131 B1 * | 3/2002 | Cheng | 700/40 |
| 6,373,033 B1 * | 4/2002 | de Waard et al. | 219/497 |
| 7,187,990 B2 * | 3/2007 | Jang et al. | 700/31 |
| 2001/0021900 A1 * | 9/2001 | Kassmann | 703/2 |
| 2003/0120361 A1 * | 6/2003 | Anderson et al. | 700/31 |
| 2004/0049299 A1 * | 3/2004 | Wojsznis et al. | 700/29 |
| 2004/0064202 A1 * | 4/2004 | Kothare et al. | 700/39 |
| 2005/0107895 A1 * | 5/2005 | Pistikopoulos et al. | 700/52 |
| 2005/0149209 A1 * | 7/2005 | Wojsznis et al. | 700/30 |

* cited by examiner

*Primary Examiner*—Ronald D Hartman, Jr.
(74) *Attorney, Agent, or Firm*—Cardinal Law Group

(57) ABSTRACT

A method of predictive control for a single input, single output (SISO) system, including modeling the SISO system with model factors, detecting output from the SISO system, estimating a filtered disturbance from the output, determining a steady state target state from the filtered disturbance and a steady state target output, populating a dynamic optimization solution table using the model factors and a main tuning parameter, and determining an optimum input from the dynamic optimization solution table. Determining an optimum input includes determining a time varying parameter, determining a potential optimum input from the time varying parameter, and checking whether the potential optimum input is the optimum input.

57 Claims, 6 Drawing Sheets

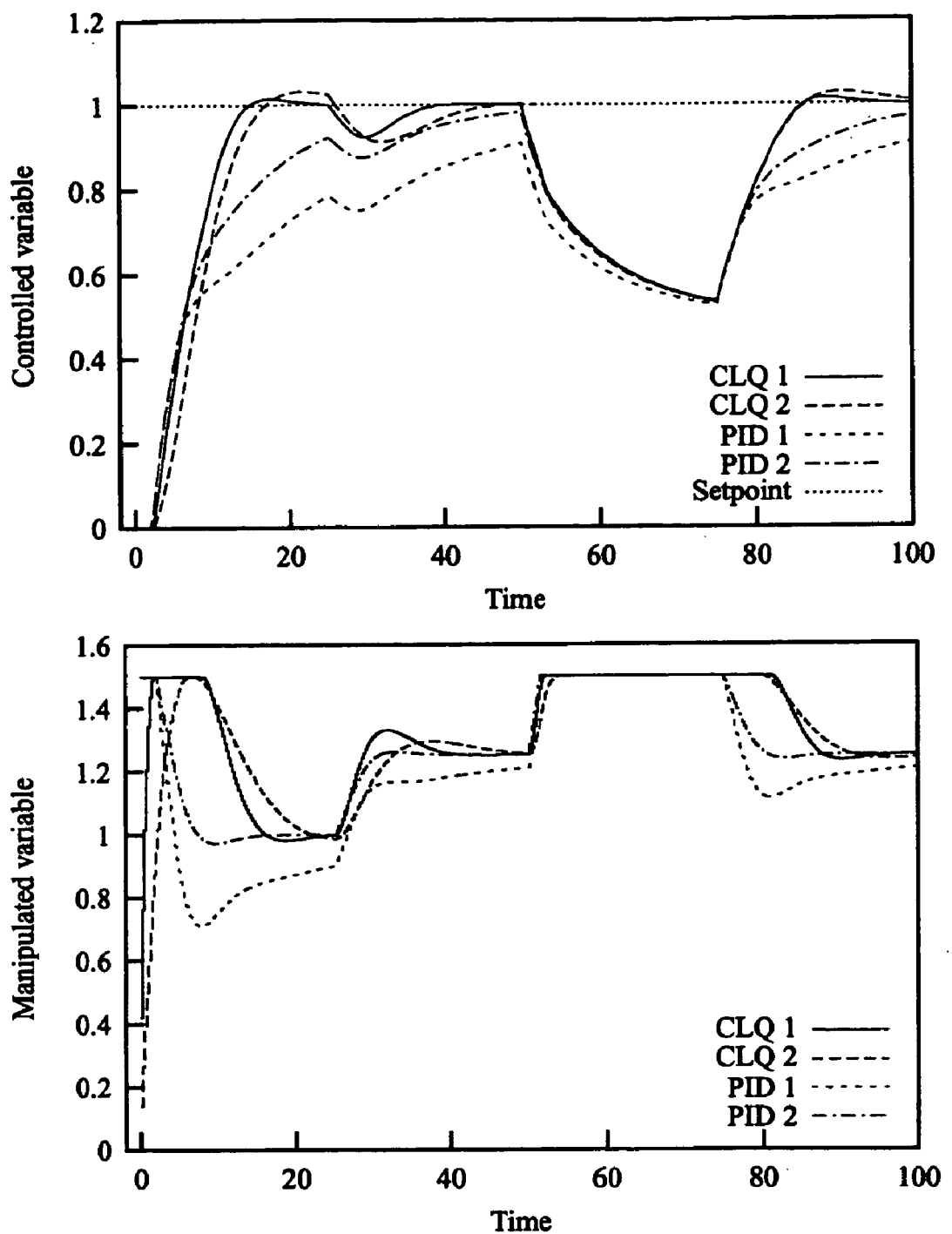
Figure 4: FOPTD system: nominal case

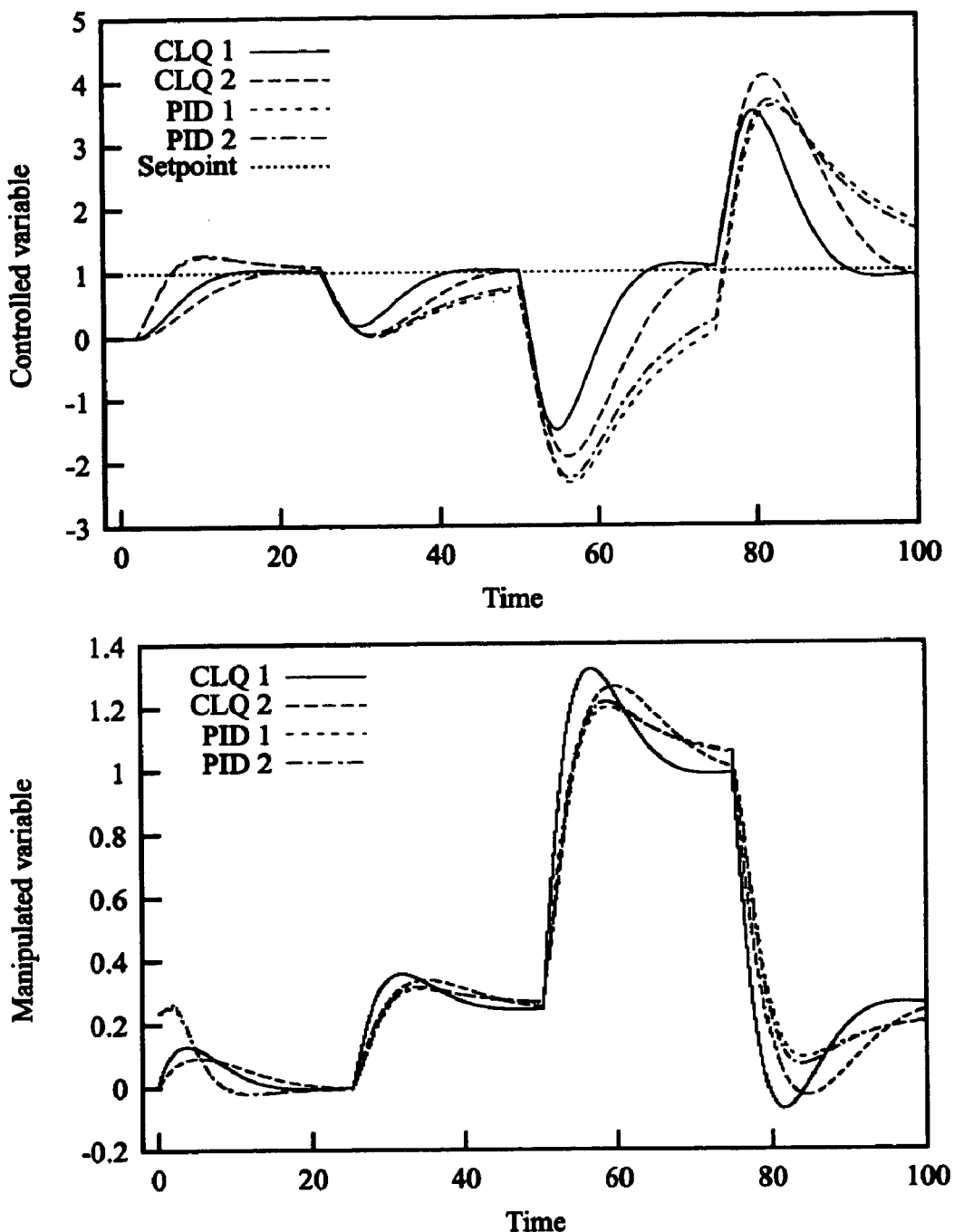
Figure 5: Integrating system: nominal case

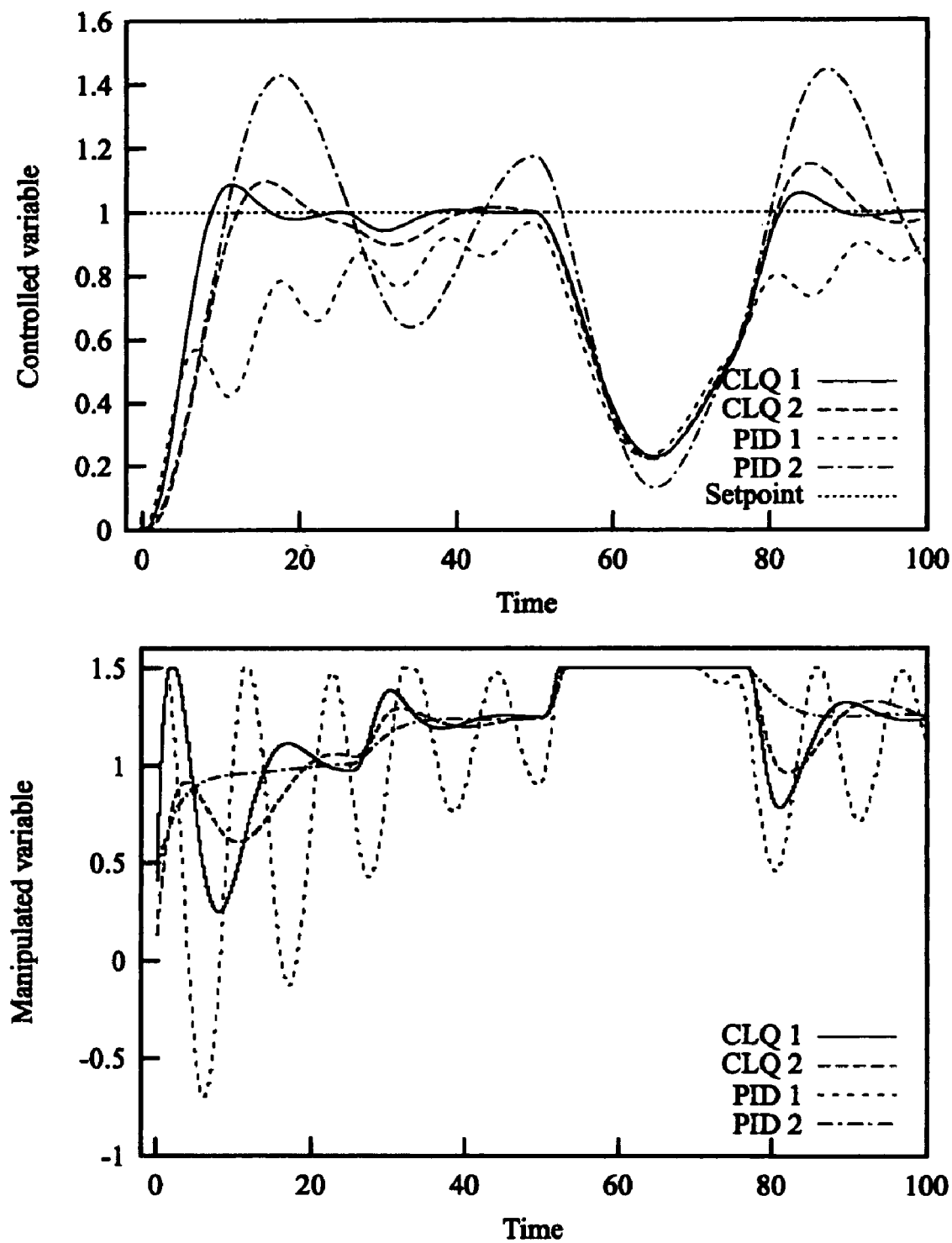
Figure 6: Under-damped system: nominal case

SISO MODEL PREDICTIVE CONTROLLER

CROSS-REFERENCE TO RELATED APPLICATIONS

This application claims priority to U.S. Provisional Patent Application No. 60/542,805, to Rawlings, et al., entitled SISO Model Predictive Controller, filed Feb. 6, 2004, and incorporated herein by reference.

STATEMENT OF GOVERNMENT RIGHTS

This invention was made with United States government support awarded by the following agency: NSF #CTS-0105360. The United States government has certain rights in this invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to system controllers, and more particularly, to a fast, easily tuned single input, single output model predictive controller.

BACKGROUND OF THE INVENTION

Systems can be defined generally as an object in which signals interact to produce an observable output signal. The system can be a physical entity, such as a chemical process, an electrical circuit, or an engine. The system can also be an abstract entity, such as the stock market or a financial system.

One important type of system is the single input, single output (SISO) system. As the name suggests, a SISO system has a single input and a single output. This is in contrast to multiple input, multiple output (MIMO) systems. SISO systems are commonly controlled using proportional-integral-derivative (PID) controllers, while MIMO systems are commonly controlled using model-based control methods, such as linear quadratic (LQ) control or model predictive control (MPC).

PID controllers are used in essentially every industrial facility using feedback control. The historic use of analog PID controllers led to the use of digital PID controllers. Yet, PID controllers have a number of limitations. PID controllers are difficult to tune, because the proportional, integral, and derivative settings are set independently, but interact to determine the control behavior. PID controllers also fall short in setpoint tracking accuracy and disturbance rejection. When the system and the model of the system are mismatched, PID control is not very robust. PID control also has difficulty handling system constraints, such as valve motion limits.

Model-based control methods are used for complex systems, such as MIMO systems, but are seldom used for the simpler systems, such as SISO systems. Model-based control systems use a model of the system and make control decisions based on the model. Model-based control systems are popular for complex systems because they can control complex systems, optimize control behavior, and account for system constraints. In spite of these benefits, existing model-based control systems are too complex for general use with SISO systems. Model-based control systems running on simple computing hardware take too long to run. Run time can be reduced by using more sophisticated computing hardware, but such hardware is too expensive for use in the many SISO systems. Tuning model-based control systems is also complex, time consuming, and expensive.

It would be desirable to have an SISO model predictive controller that would overcome the above disadvantages.

SUMMARY OF THE INVENTION

One aspect of the present invention provides a SISO model predictive controller which is able to make control decisions quickly.

Another aspect of the present invention provides a SISO model predictive controller which runs on simple computing hardware.

Another aspect of the present invention provides a SISO model predictive controller which optimizes control behavior.

Another aspect of the present invention provides a SISO model predictive controller affording ease of tuning.

Another aspect of the present invention provides a SISO model predictive controller affording setpoint tracking accuracy and disturbance rejection.

Another aspect of the present invention provides a SISO model predictive controller affording robustness in the case of system/model mismatch.

Another aspect of the present invention provides a SISO model predictive controller able to handle complex systems and system constraints.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIGS. 4-6 are simulation results showing the performance of a SISO model predictive controller made in accordance with the present invention.

DETAILED DESCRIPTION OF THE INVENTION

The present invention is further described in the paper entitled "A Candidate to Replace PID Control: SISO Constrained LQ Control" attached hereto as Appendix 1 and incorporated herein by reference.

Figure 1:
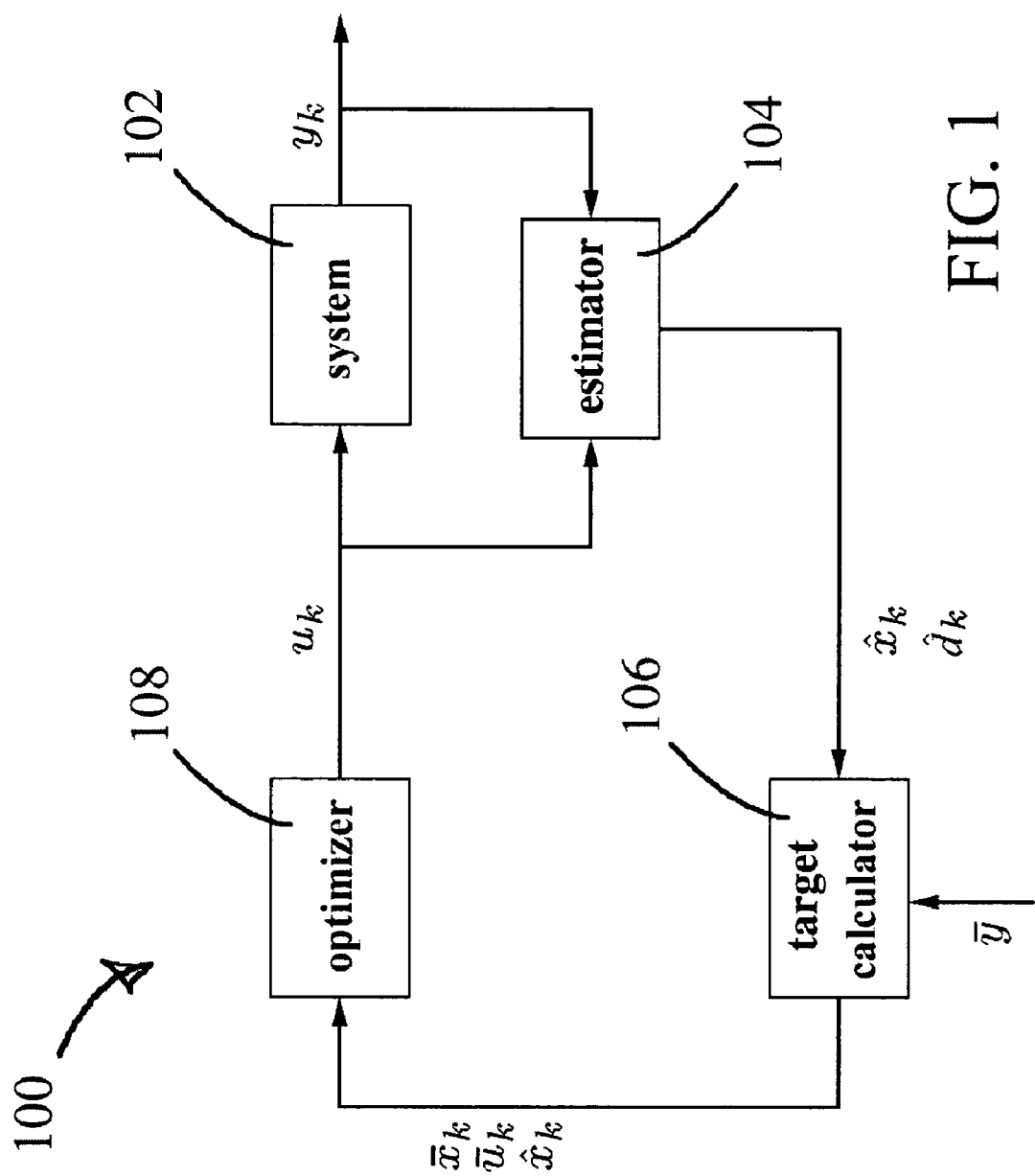
FIG. 1 is a block diagram of an SISO model predictive controller made in accordance with the present invention.

FIG. 1 is a block diagram of an SISO model predictive controller made in accordance with the present invention. The SISO model predictive controller 100 controls a system 102 having an input $u_k$ and an output $y_k$. The SISO model predictive controller 100 includes a state and disturbance estimator 104 receiving the input $u_k$ and the output $y_k$, and generating a filtered state x*hat*k and a filtered disturbance d*hat*k; a constrained target calculator 106 receiving the filtered disturbance d*hat*k and a steady state target output y*bar, and generating a steady state target state x*bar*k and a steady state target input u*bar*k; and a constrained dynamic optimizer 108 receiving the filtered state x*hat*k, the filtered disturbance d*hat*k, the steady state target state x*bar*k, and the steady state target input u*bar*k, and generating an optimized input $u_k$.

The system 102 is any single input, single output (SISO) system, having an input $u_k$ and output $y_k$. The system 102 can be linear or non-linear. The state of the system 102 is described with a state vector $x_k$. The system can be a physical entity, such as a chemical process, an electrical circuit, or an engine, or an abstract entity, such as a financial system. The state-space discrete time model of the system 102 is a linear model written as:

$$x_{k+1} = Ax_k + Bu_{k-m}$$

$$y_k = Cx_k \quad (1)$$

where the state x is a real state vector, the input u is a real number and the output y is a real number. A, B, and C are model factors representing the system 102. The time increment k is a non-negative integer and m is a non-negative integer accounting for the time delay between the input and the state. The input u is constrained between a minimum and maximum value:

$$u_{min} \leq u \leq u_{max} \quad (3)$$

where $u_{min}$ is less than $u_{max}$. The constraints account for limitations on the input to the system 102, e.g., valve travel limits in a chemical process or current limits in an electrical circuit. Those skilled in the art will appreciate that the system 102 can be any number of SISO systems.

Figure 2:
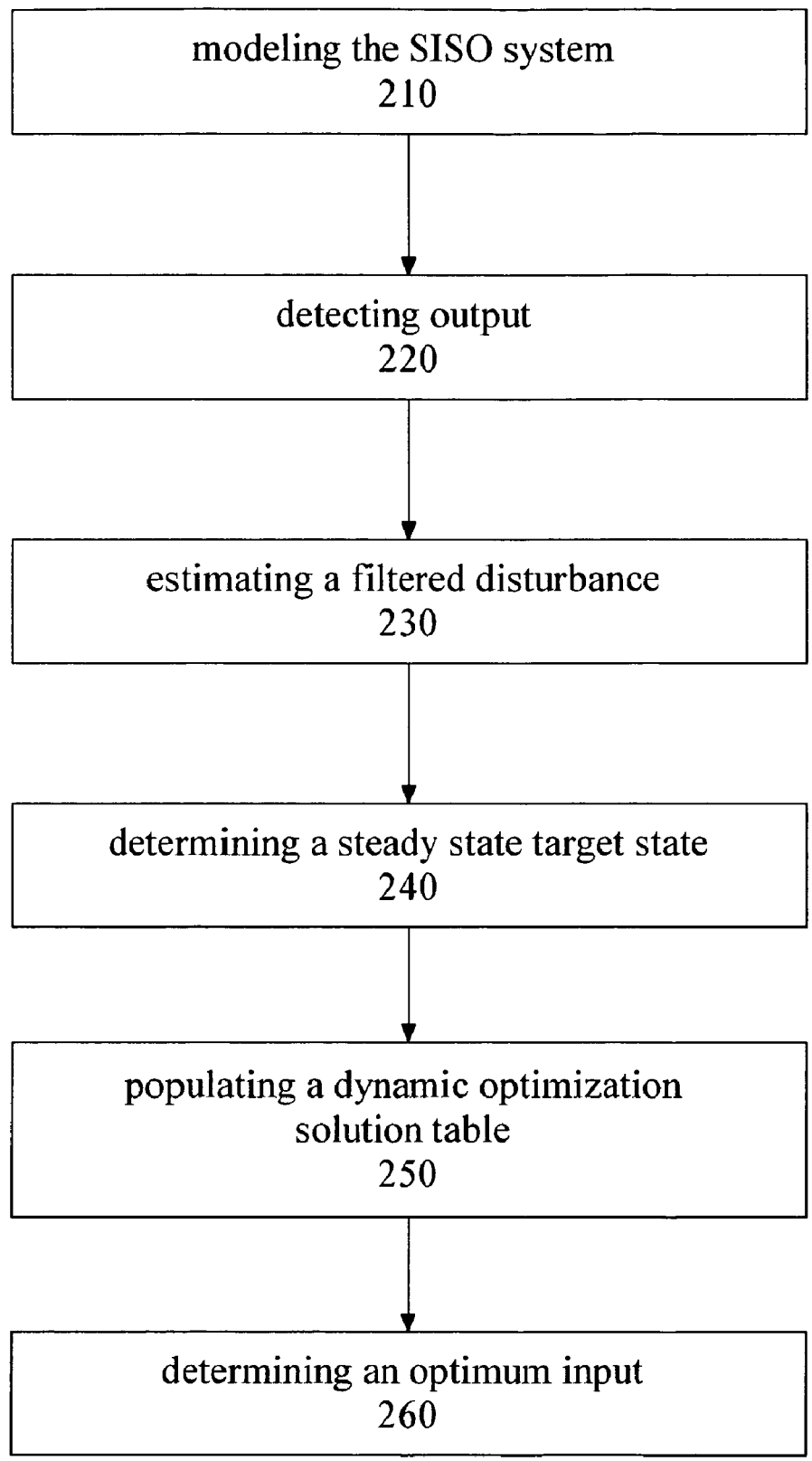
FIG. 2 is a flow chart of a method of model predictive control for a SISO system made in accordance with the present invention.

FIG. 2 is a flow chart of a method of model predictive control for a SISO system made in accordance with the present invention. The method includes modeling the SISO system with model factors 210, detecting output from the SISO system 220, estimating a filtered disturbance from the output 230, determining a steady state target state from the filtered disturbance and a steady state target output 240, populating a dynamic optimization solution table using the model factors and a main tuning parameter 250, and determining an optimum input from the dynamic optimization solution table 260.

Modeling the SISO system with model factors 210 involves modeling the SISO system as a state-space discrete time model with model factors as discussed above for FIG. 1.

Detecting output from the SISO system 220 involves detecting output using detectors appropriate for the SISO system. For example, if the SISO system is a chemical tank with fluid flow to the tank, the input can be a parameter controlling flow rate to the tank, such as a valve position demand signal. The output can be tank level as measured by a level detector in the tank. In another example, if the SISO system is a fluid filled tank, the input can be a parameter controlling heat input to the tank, such as a steam valve position demand signal or a resistance heater current demand signal. The output can be measured tank temperature.

Estimating a filtered disturbance from the output 230 involves calculating filter gains offline and using the filter gains online to calculate the current filtered state and filtered disturbance. The estimate uses a steady-state Kalman filter. The disturbance arises from augmenting the model of Equation 1 with an integrating disturbance. Adding an input disturbance guarantees offset-free control of the output y in the presence of plant/model mismatch and/or unmeasured integrating disturbances.

The filter gains are calculated from the values used in the model of the system in Equation 1 as follows:

$$\hat{A} = \begin{bmatrix} A & B \\ 0 & 1 \end{bmatrix}, \hat{Q} = \begin{bmatrix} q_x I_n & 0 \\ 0 & 1 \end{bmatrix}, \hat{C} = [C \quad 0] \quad (7a)$$

where the estimator tuning parameter $q_x$ is a non-negative scalar and the column vector $I_n$ has all elements equal to one. The estimator tuning parameter $q_x$ is typically between 0 and 1, and a value of 0.05 has performed satisfactorily in various system simulations.

The estimator steady-state Riccati equation is:

$$\Pi = \hat{Q} + \hat{A}\Pi\hat{A}^T - \hat{A}\Pi\hat{C}^T(\hat{C}\Pi\hat{C}^T + R_v)^{-1}\hat{C}\Pi\hat{A}^T, \quad (7b)$$

where the output noise covariance parameter $R_v$ is a positive scalar. The output noise covariance parameter $R_v$ is a measure of the noise on the measured output signal y. A value of 0.01 for the output noise covariance parameter $R_v$ has performed satisfactorily in various system simulations. The ratio of the estimator tuning parameter $q_x$ to the output noise covariance parameter $R_v$ determines the responsiveness of the filtered state and filtered disturbance estimation. $\cup$ is a symmetric semi-definite matrix of real numbers.

Finally, the filter gains are:

$$L = \begin{bmatrix} L_x \\ L_d \end{bmatrix} = \Pi\hat{C}^T(\hat{C}\Pi\hat{C}^T + R_v)^{-1} \quad (7c)$$

where the state filter gain $L_x$ is a real column vector and the disturbance filter gain $L_d$ is a real number. The filter gains are typically calculated offline, then used in the online calculation of the current filtered state and disturbance to speed operation of the SISO model predictive controller. In an alternative embodiment, new filter gains can be calculated online while the estimator continues to use the current filter gains until the new filter gains have been calculated. Typically, the filter gains change slowly because the nature of the disturbances changes slowly.

The current filtered state and filtered disturbance are estimated online in real time using the filter gains calculated offline in Equation 7c:

$$\hat{x}_{k|k} = \hat{x}_{k|k-1} + L_x(y_k - C\hat{x}_{k|k-1}) \quad (5)$$

$$\hat{d}_{k|k} = \hat{d}_{k|k-1} + L_d(y_k - C\hat{x}_{k|k-1}),$$

where $y_k$ is the current output. The current (k) value of the filtered state x*hat*k and the filtered disturbance d*hat*k are a function of the prior (k-1) value of the filtered state x*hat*k-1 and the filtered disturbance d*hat*k-1, respectively, and the prior (k-1) value of the filtered state x*hat*k-1. For the initial run at k=0, the prior (k-1) values are not critical and can be set to any value, such as zero.

Determining a steady state target state from the filtered disturbance and a steady state target output 240 involves calculating a constrained target matrix M and constrained target gains $G_1$, $G_2$, and $G_3$, offline and using the constrained target matrix and gains online to calculate the steady state target state.

The constrained target matrix M is calculated using the following equation with the values used in the model of the system in Equation 1:

$$\begin{bmatrix} I-A & -B \\ C & 0 \end{bmatrix}^{-1} \begin{bmatrix} B & 0_{n\times 1} \\ 0 & 1 \end{bmatrix} \begin{bmatrix} \hat{d}_{k|k} \\ \overline{y} \end{bmatrix} = \begin{bmatrix} M_{11} & M_{12} \\ M_{21} & M_{22} \end{bmatrix} \begin{bmatrix} \hat{d}_{k|k} \\ \overline{y} \end{bmatrix} \quad (31)$$

where $M_{11}$ and $M_{12}$ are real column vectors and $M_{21}$ and $M_{22}$ are real numbers.

The constrained target gains $G_1$, $G_2$, and $G_3$ are calculated using the following equation with the values used in the model of the system in Equation 1:

$$[C^T C + \eta(I-A)^T(I-A)]^{-1}[C^T \overline{y} + \eta(I-A)^T B(\overline{u}_k + \overline{d}_{k|k})] = G_1$$
$$\overline{d}_{k|k} + G_2 \overline{y} + G_3 \overline{u}_k \quad (34)$$

where steady state factor $\eta$ is a large positive number, such as $10^6$. Steady state factor $\eta$ is included in the quadratic program for the constrained input steady state target calculation to guarantee that the solution for the steady state target state and input is the steady state solution, if a steady state solution exists.

The constrained target matrix M and constrained target gains $G_1$, $G_2$, and $G_3$ are typically calculated offline, then used in the online calculation of the steady state target state and input to speed operation of the SISO model predictive controller. In an alternative embodiment, either or both of the constrained target matrix M and constrained target gains $G_1$, $G_2$, and $G_3$ can be calculated online when the system change is slow and controller speed is not critical.

The steady state target state u*bar*k and the steady state target input x*bar*k are determined online in real time according to the procedure below.

First, an unconstrained target input u*bar* star is calculated according to the equation:

$$\overline{u}^* = M_{21} \hat{d}_{k|k} + M_{22} \overline{y}. \quad (34a)$$

Second, the unconstrained target input u*bar*star is checked to see whether the unconstrained target input u*bar* star falls within the input constraints of Equation 3:

$$u_{min} \leq \overline{u}^* \leq u_{max} \quad (34b)$$

If the unconstrained target input u*bar*star falls on or within the input constraints, the steady state target input u*bar*k is set to the value of the unconstrained target input u*bar*star just calculated. The steady state target state x*bar*k is calculated according to the equation:

$$\overline{x}_k = M_{11} \hat{d}_{k|k} + M_{12} \overline{y} \quad (34c)$$

Third, if the unconstrained target input u*bar*star falls outside the input constraints, the steady state target state u*bar*k is set as follows:

$$\overline{u}_k = \begin{cases} u_{min} & \text{if } \overline{u}^* < u_{min} \\ u_{max} & \text{if } \overline{u}^* > u_{max} \end{cases} \quad (32)$$

The steady state target input x*bar*k is calculated according to the equation:

$$\overline{x}_k = G_1 \hat{d}_{k|k} + G_2 \overline{y} + G_3 \overline{u}_k \quad (34d)$$

Populating a dynamic optimization solution table using the model factors and a main tuning parameter 250 involves calculating possible inputs for all the selection components of the input u offline and storing the selection components in a dynamic optimization solution table for use in selecting the optimum input. Each component of u can be at the lower bound, at the upper bound, or between the lower bound and the upper bound. Therefore, the total number of possible inputs is $3^N$, where N is the number of time increments to the horizon. In one example, N is 5 and the total number of possible inputs is 243. The selection components are the active constraint matrix $A_i$, the optimal input solution offset $B_i$, and the optimal input solution gain $K_i$. The components of the input u are constant for a given model with given tuning parameters.

The active constraint matrix $A_i$ and active constraint vector $b_i$ is $$A_i = \begin{bmatrix} -I \\ I \end{bmatrix}, b_i = \begin{bmatrix} -1 u_{max} \\ 1 u_{min} \end{bmatrix} \quad (42c)$$

which occurs from substituting $A_i$ and $b_i$ for D and d, respectively, in the constraint expression of Equation 37b:

$$Du \geq d, \quad (37b)$$

The optimal input solution offset $B_i$ and optimal input solution gain $K_i$ are calculated from:

$$K_i = -Z_i(Z_i^T H Z_i)^{-1} Z_i^T, B_i = \overline{u}_i - Z_i(Z_i^T H Z_i)^{-1} Z_i^T H \overline{u}_i. \quad (51)$$

where:

$$H = \mathcal{B}^T \mathcal{Q} \mathcal{B} + \mathcal{D}^T \mathcal{R} \mathcal{D} \quad (14)$$

$Z_i$ is a real matrix whose columns form a basis for the null space of $A_i$, $$\mathcal{A} = \begin{bmatrix} A \\ A^2 \\ \vdots \\ A^N \\ 0 \end{bmatrix}, \mathcal{B} = \begin{bmatrix} B & 0 & \cdots & 0 \\ AB & B & \cdots & 0 \\ \vdots & \vdots & \ddots & \vdots \\ A^{N-1}B & A^{N-2}B & \cdots & B \\ 0 & 0 & \cdots & 0 & 1 \end{bmatrix}, \quad (15a)$$

$$\mathcal{C} = \begin{bmatrix} -1 \\ 0 \\ \vdots \\ 0 \end{bmatrix}, \mathcal{D} = \begin{bmatrix} 1 & 0 & \cdots & 0 \\ -1 & 1 & \cdots & 0 \\ 0 & \ddots & \ddots & \vdots \\ \vdots & 0 & -1 & 1 \end{bmatrix},$$

$$\mathcal{Q} = \begin{bmatrix} Q & 0 & \cdots & 0 \\ 0 & \ddots & & \vdots \\ \vdots & & Q & 0 \\ 0 & \cdots & 0 & P \end{bmatrix}, \mathcal{R} = \begin{bmatrix} s & 0 & \cdots & 0 \\ 0 & \ddots & & \vdots \\ \vdots & & \ddots & 0 \\ 0 & \cdots & 0 & s \end{bmatrix}. \quad (15b)$$

$$\overline{u}_i = A_i^T b_i. \quad (46)$$

A, B, and C are the model factors from the state-space discrete-time model:

$$x_{k+1} = A x_k + B u_{k-m}$$

$$y_k = C x_k \quad (1)$$

P and Q arise from the solution of the constrained dynamic optimization problem:

$$Q = C^T C \quad (10e)$$

$$P = \tilde{Q} + \tilde{A}^T P \tilde{A} - \tilde{A}^T P \tilde{B} (\tilde{B}^T P \tilde{B} + s)^{-1} \tilde{B} P \tilde{A} \qquad (11)$$

where:

$$\tilde{A} = \begin{bmatrix} A & B \\ 0 & 1 \end{bmatrix}, \tilde{B} = \begin{bmatrix} B \\ 1 \end{bmatrix}, \tilde{Q} = \begin{bmatrix} Q & 0 \\ 0 & 0 \end{bmatrix}. \qquad (12)$$

The main tuning parameter s is any positive number and determines the speed of response and robustness of the model predictive controller. Tuning and the main tuning parameter s are discussed below.

Once the active constraint matrix $A_i$, the optimal input solution offset $B_i$, and the optimal input solution gain $K_i$ have been calculated offline, the optimum input is determined at each time increment from the dynamic optimization solution table.

Determining an optimum input from the dynamic optimization solution table 260 involves calculating a time varying parameter c for the current time increment, determining a potential optimum input from the time varying parameter, and checking whether the potential optimum input is the optimum input. The calculation depends on whether the steady state target output y*bar is reachable or unreachable. The time varying parameter c is used with the values from the dynamic optimization solution table to calculate potential optimum inputs $u_i$, until the optimum input meeting the constraints and having a non-negative Lagrange multiplier is found.

The time varying parameter c is calculated from the equation:

$$c = \tilde{c} - H\bar{u}_k \qquad (36c)$$

where u*bar*k is the current steady state target input and the Hessian H is calculated as above from:

$$H = \mathscr{B}^T \mathscr{Q} \mathscr{B} + \mathscr{D}^T \mathscr{R} \mathscr{D} \qquad (14)$$

The method of calculating the intermediate time varying parameter c*tilde depends on whether the steady state target output y*bar is reachable or unreachable. The steady state target output y*bar is reachable if:

$$C\bar{x}_k = \bar{y} \qquad (10)$$

where C is the matrix from the state-space discrete time model of Equation 1.

If the steady state target output y*bar is reachable, the intermediate time varying parameter c*tilde is calculated from:

$$\tilde{c} = \mathscr{B}^T \mathscr{Q} \mathscr{A} w_o + \mathscr{D}^T \mathscr{R} \mathscr{C} v_{-1} \qquad (14)$$

where:

$$\mathscr{A} = \begin{bmatrix} A \\ A^2 \\ \vdots \\ A^N \\ 0 \end{bmatrix}, \mathscr{B} = \begin{bmatrix} B & 0 & \cdots & 0 \\ AB & B & \cdots & 0 \\ \vdots & \vdots & \ddots & \vdots \\ A^{N-1}B & A^{N-2}B & \cdots & B \\ 0 & \cdots & & 0 & 1 \end{bmatrix}, \qquad (15a)$$

$$\mathscr{C} = \begin{bmatrix} -1 \\ 0 \\ \vdots \\ 0 \end{bmatrix}, \mathscr{D} = \begin{bmatrix} 1 & 0 & \cdots & 0 \\ -1 & 1 & \cdots & 0 \\ 0 & \ddots & \ddots & \vdots \\ \vdots & 0 & -1 & 1 \end{bmatrix}.$$

$$\mathscr{Q} = \begin{bmatrix} Q & 0 & \cdots & 0 \\ 0 & \ddots & & \vdots \\ \vdots & & Q & 0 \\ 0 & \cdots & 0 & P \end{bmatrix}, \mathscr{R} = \begin{bmatrix} s & 0 & \cdots & 0 \\ 0 & \ddots & & \vdots \\ \vdots & & \ddots & 0 \\ 0 & \cdots & 0 & s \end{bmatrix}. \qquad (15b)$$

$$\bar{u}_i = A_i^T b_i. \qquad (46)$$

A, B, and C are the model factors from the state-space discrete-time model:

$$x_{k+1} = Ax_k + Bu_{k-m}$$

$$y_k = Cx_k. \qquad (1)$$

P and Q arise from the solution of the constrained dynamic optimization problem:

$$Q = C^T C \qquad (10e)$$

$$P = \tilde{Q} + \tilde{A}^T P \tilde{A} - \tilde{A}^T P \tilde{B} (\tilde{B}^T P \tilde{B} + s)^{-1} \tilde{B} P \tilde{A} \qquad (11)$$

where:

$$\tilde{A} = \begin{bmatrix} A & B \\ 0 & 1 \end{bmatrix}, \tilde{B} = \begin{bmatrix} B \\ 1 \end{bmatrix}, \tilde{Q} = \begin{bmatrix} Q & 0 \\ 0 & 0 \end{bmatrix}. \qquad (12)$$

The state difference $w_0$ and input difference $v_{-1}$ are calculated from:

$$w_0 = \tilde{x}_{k+m|k} - \tilde{x}_k = \left[ A^m \tilde{x}_{k|k} + \sum_{i=1}^{m} A^{i-1} B \left( u_{k-i} + \hat{d}_{k|k} \right) \right] - \tilde{x}_k, \qquad (10b)$$

$$v_{-1} = u_{k-1} - \tilde{u}_k,$$

where m is a non-negative integer accounting for the time delay between the input and the state. The initial values of the parameters above can be set to any value, such as zero.

The main tuning parameter s is any positive number and determines the speed of response and robustness of the model predictive controller. Tuning and the main tuning parameter s are discussed below.

If the steady state target output y*bar is unreachable, as determined from:

$$\bar{y}_k = C\bar{x}_k \neq \bar{y}, \qquad (20)$$

The intermediate time varying parameter c*tilde is calculated from:

$$\tilde{c} = \mathscr{B}^T w_o + \mathscr{B}^T \mathscr{P} + \mathscr{D}^T \mathscr{R} \mathscr{C} v_{-1}, \qquad (23)$$

where:

$$\mathscr{P} = [q^T \ldots q^T p^T]^T \qquad (23a)$$

with:

$$q = C^T (\bar{y}_k - \bar{y}), \, p = \left( I - (\tilde{A} + \tilde{B}\tilde{K})^T \right)^{-1} \begin{bmatrix} q \\ 0 \end{bmatrix}. \qquad (22)$$

$$K = \tilde{K} + [0_{1 \times n} \quad 1], \tilde{K} = -(s + \tilde{B}^T P \tilde{B})^{-1} \tilde{B}^T P \tilde{A}. \qquad (19)$$

$$\tilde{A} = \begin{bmatrix} A & B \\ 0 & 1 \end{bmatrix}, \tilde{B} = \begin{bmatrix} B \\ 1 \end{bmatrix}, \tilde{Q} = \begin{bmatrix} Q & 0 \\ 0 & 0 \end{bmatrix}. \qquad (12)$$

Once the intermediate time varying parameter c*tilde has been calculated, the time varying parameter c is calculated from the equation:

$$c = \bar{c} - H\bar{u}_k \quad (36c)$$

Potential optimum inputs $u_i$ are calculated until the optimum input meeting the constraints and having a non-negative Lagrange multiplier is found. Using c and starting with i=1, the first potential optimum input $u_i$ is calculated from:

$$u_i = K_i c + B_i. \quad (52a)$$

where the optimal input solution offset $B_i$ and optimal input solution gain $K_i$ are calculated as above from:

$$K_i = -Z_i(Z_i^T H Z_i)^{-1} Z_i^T, \; B_i = \bar{u}_i - Z_i(Z_i^T H Z_i)^{-1} Z_i^T H \bar{u}_i. \quad (51)$$

The potential optimum input $u_i$ is checked to see that it meets the constraint condition of:

$$Du \geq d, \quad (37b)$$

where:

$$D = \begin{bmatrix} -I \\ I \end{bmatrix}, d = \begin{bmatrix} -1 u_{\max} \\ 1 u_{\min} \end{bmatrix}. \quad (38)$$

If the potential optimum input $u_i$ does not meet the constraint condition, the potential optimum input $u_i$ is not the optimum input. The counter i is increased to i+1 and a new potential optimum input $u_i$ is calculated.

If the potential optimum input $u_i$ does meet the constraint condition, the active constraint Lagrange multipliers are checked using:

$$\lambda_i = A_i(H u_i + c). \quad (52)$$

If any element of the active constraint Lagrange multiplier vector $\lambda_i$ is zero or negative, the potential optimum input $u_i$ is not the optimum input. The counter i is increased to i+1 and a new potential optimum input $u_i$ is calculated.

If all elements of the active constraint Lagrange multiplier vector $\lambda_i$ are non-negative, the potential optimum input $u_i$ is the optimum input. The optimum input is provided to the system as the control input.

In one embodiment, the calculation of the active constraint Lagrange multipliers can be simplified due to the nature of the active constraint matrix $A_i$. Each row of the active constraint matrix $A_i$ contains only a single non-zero element, that being either 1 or −1. The gradient vector $g_i$ can be calculated from:

$$g_i = H u_i + c \; ( \quad (52b)$$

and elements of the gradient vector $g_i$ compared to the corresponding non-zero elements of the active constraint matrix $A_i$. Multiplication of the active constraint matrix $A_i$ and the gradient vector $g_i$ is not required, further increasing the speed of operation of the model predictive controller.

The size of the dynamic optimization solution table provides for $3^N$ possible inputs, where N is the number of time increments to the horizon. The number N is selected to be as large as possible, consistent with limitations in the storage capacity available for the dynamic optimization solution table and the operations time required to go through the calculations involving the dynamic optimization solution table. In one embodiment, the number N is 5, requiring the dynamic optimization solution table to handle 243 possible inputs.

In another embodiment, the dynamic optimization solution table is ordered so that the possible inputs that are most likely to be the optimum input are calculated early in the search, when the counter value is relatively small. If the dynamic optimization solution table is random, it will be necessary to work through one half of the possible inputs, on average, before the optimum input is found. Ordering the dynamic optimization solution table increases the speed of operation of the model predictive controller because the optimum input is found earlier.

The tuning of the SISO model predictive controller can be performed offline, online, or in a combination of offline and online. The offline tuning uses system simulations to determine system performance for various controller settings. The online tuning is performed using the actual system, so provides the desired result in practice. The combination of offline and online tuning uses the offline system simulations to determine preliminary controller settings and online tuning to finalize the controller settings.

The estimator tuning parameter $q_x$ and output noise covariance parameter $R_v$ affect the state filter gain $L_x$ and the disturbance filter gain $L_d$ as used in estimating a filtered state and a filtered disturbance 220. The filter gains are re-calculated if the estimator tuning parameter $q_x$ or output noise covariance parameter $R_v$ is changed. No other parameters need to be re-computed.

The main tuning parameter s affects the values used in populating the dynamic optimization solution table 240, so the dynamic optimization solution table is re-calculated if the main tuning parameter s is changed. The main tuning parameter s can be any positive number. An initial value of 1 is typically selected and the value adjusted, trading off speed of response and robustness of control. Values of the main tuning parameter s from 1 to 5000 have performed satisfactorily in various system simulations, depending on the particular system modeled.

Figure 3:
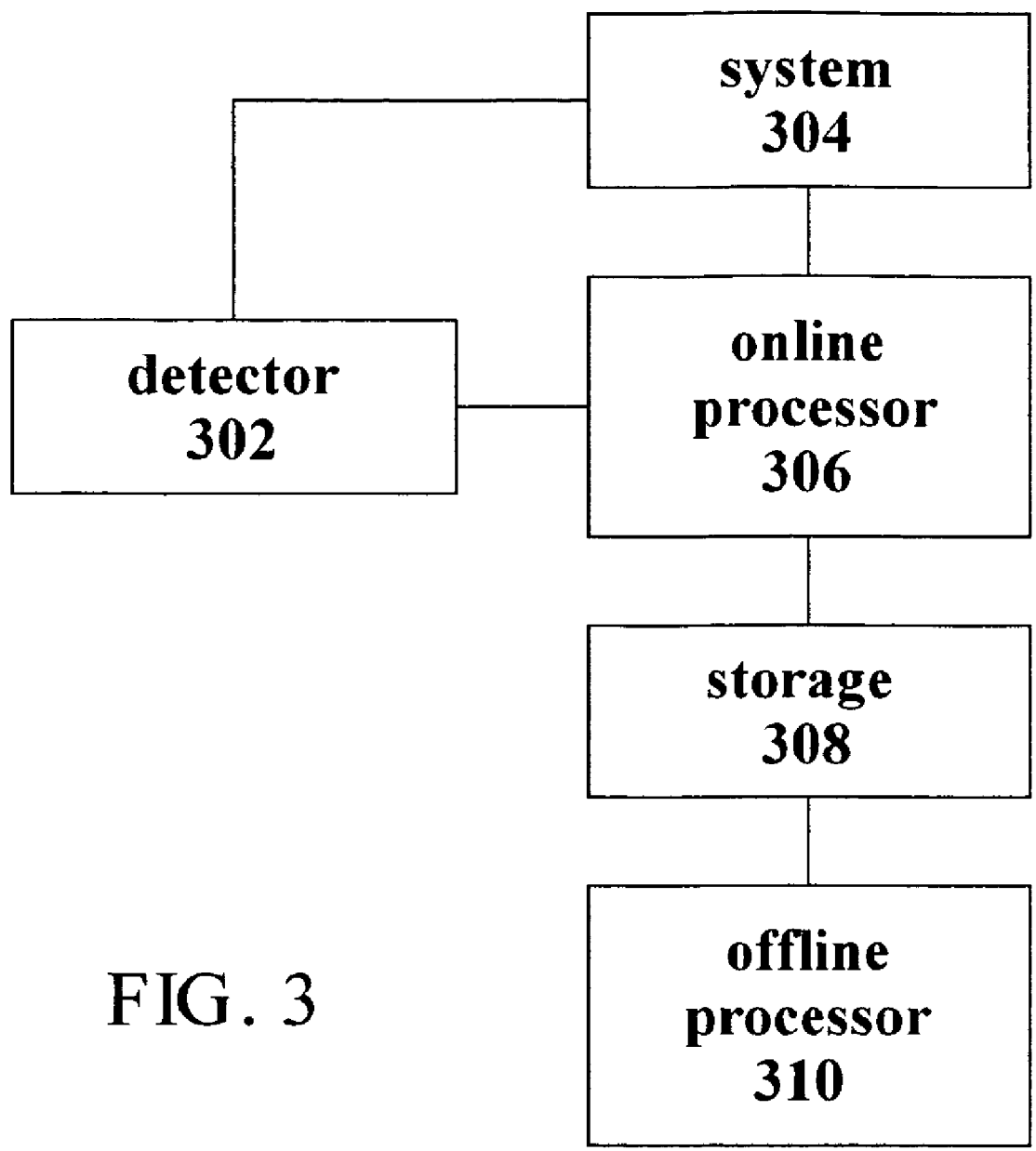
FIG. 3 is a hardware diagram of a SISO model predictive controller made in accordance with the present invention.

FIG. 3 is a hardware diagram of a SISO model predictive controller made in accordance with the present invention. The controller 300 includes a detector 302 providing a measured output from the system 304 to an online processor 306, which supplies an input to the system 304. The storage 308 stores parameters calculated by the offline processor 310 for use by the online processor 306.

The detector 302 is any detector capable of measuring the output from the system 304, such as fluid level, fluid flow, electrical voltage, electrical current, or any other measurable output. The offline processor 310 is any general purpose computer, dedicated computer, personal computer, or the like, including a computer readable medium storing a computer program for calculating the offline parameters as discussed for FIG. 2 above. The storage 308 is any computer readable medium, such as read only memory, random access memory, a memory device, a compact disc, a floppy disk, or the like, able to store the offline parameters and computer readable code storing a computer program for controlling operations of the online processor 306. The online processor 306 is any personal computer, microcontroller, microprocessor, or the like, programmed to calculate the optimum input as discussed for FIG. 2 above. In various embodiments, the detector 302, online processor 306, storage 308, offline processor 310, and/or any combinations or subcombinations thereof are imprinted on a single chip, such as an Application-Specific Integrated Circuit (ASIC).

In an alternative embodiment, both the offline processor 310 and the online processor 306 are different operations on a single computer. In another embodiment, the offline processor 310 is operational to update, adjust, and optimize the offline parameters while the online processor 306 is operating. In yet another embodiment, the offline processor 310 is inactive or removed from the controller 300 when the online processor 306 is operating.

FIGS. 4-6 are simulation results showing the performance of a SISO model predictive controller made in accordance with the present invention. FIGS. 4-6 show examples of the performance of the SISO model predictive controller in controlling a first order plus time delay (FOPTD) system, an integrating system, and a second order under-damped system, respectively. For comparison, each example shows the results of SISO model predictive control and PID control, with the input u labeled as Manipulated Variable and the output y labeled as Controlled Variable. In each case, the SISO model predictive control tracks the target output setpoint more closely than the PID control for both changes in setpoint and rejection of external disturbances. Similar results are observed in the presence of random output noise. Further results also show the robustness of the SISO model predictive controller, i.e., the ability of the controller to provide accurate control even when the system and the model are mismatched.

FIG. 4 shows the performance of the SISO model predictive controller in controlling a first order plus time delay (FOPTD) system with the system modeled as:

$$G_1(s) = \frac{e^{-2s}}{10s+1},$$

The system is sampled with $T_s=0.25$. The input is constrained with $|u|$ less than or equal to 1.5, and the horizon is N=4. The target output setpoint is changed from 0 to 1 at time zero. A load disturbance of magnitude −0.25, i.e., a disturbance passed through the same dynamics as the plant, enters the system at time 25. At time 50, the disturbance magnitude becomes −1, which makes the target output setpoint of 1 unreachable. At time 75, the disturbance magnitude returns to −0.25.

The results for the SISO model predictive controllers are labeled as CLQ 1 and CLQ 2 in FIG. 4. The estimator is designed with estimator tuning parameter $q_x=0.05$ and the output noise covariance parameter $R_v=0.01$ for both SISO model predictive controllers, while the main tuning parameter is s=5 for CLQ 1 and s =50 for CLQ 2. The tuning parameters for the first PID controller, labeled as PID 1, were chosen according to Luyben's rules as $K_c=2.51$, $T_i=17.3$, and $T_d=0$. The tuning parameters for the second PID controller, labeled as PID 2, were chosen according to Skogestad's internal model control (IMC) rules as $K_c=2.35$, $T_i=10$, and $T_d=0$. For the first order plus time delay (FOPTD) system, the SISO model predictive control tracks the target output setpoint more closely than the PID control for both changes in setpoint and rejection of external disturbances.

FIG. 5 shows the performance of the SISO model predictive controller in controlling an integrating system with the system modeled as:

$$G_2(s) = \frac{e^{-2s}}{s},$$

The parameters for the transients and the SISO model predictive controller are the same as those used in FIG. 4, except that the main tuning parameter is s=2500 for CLQ 1 and s=10000 for CLQ 2. The tuning parameters for PID 1 were chosen according to Luyben's rules as $K_c=0.23$, $T_i=18.7$, and $T_d=0$. The tuning parameters for PID 2 were chosen according to Skogestad's internal model control (IMC) rules as $K_c=0.23$, $T_i=17$, and $T_d=0$. For the integrating system, the SISO model predictive control tracks the target output setpoint more closely than the PID control for both changes in setpoint and rejection of external disturbances.

FIG. 6 shows the performance of the SISO model predictive controller in controlling a second order under-damped system with the system modeled as:

$$G_3(s) = \frac{K}{\tau^2 s^2 + 2\tau\xi s + 1},$$

The system model nominal parameters were chosen as K=1, $\tau=5$, and $\xi=0.2$. The parameters for the transients and the SISO model predictive controller are the same as those used in FIG. 4. The main tuning parameter is s=5 for CLQ 1 and s=50 for CLQ 2. The tuning parameters for PID 1 were chosen according to Luyben's rules as $K_c=7.29$, $T_i=16.8$, and $T_d=1.21$. The tuning parameters for PID 2 were chosen according to Skogestad's internal model control (IMC) rules as $K_c=0.40$, $T_i=2$, and $T_d=12.5$. An exponential output filter with a time constant $T_f=1.1$ was applied to both PID 1 and PID 2 to avoid an overly oscillatory response in the presence of output noise. For the second order under-damped system, the SISO model predictive control tracks the target output setpoint more closely than the PID control for both changes in setpoint and rejection of external disturbances.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of predictive control for a single input, single output (SISO) system generating an optimum input for controlling the SISO system, comprising:
    modeling the SISO system with model factors;
    detecting output from the SISO system;
    estimating a filtered disturbance from the output;
    determining a steady state target state from the filtered disturbance and a steady state target output;
    populating a dynamic optimization solution table using the model factors and a main tuning parameter;
    determining the optimum input from the dynamic optimization solution table; and
    controlling the SISO system in response to the optimum input;
    wherein the estimating a filtered disturbance from the output comprises:
    determining filter gains from the model factors, an estimator tuning parameter, and an output noise covariance parameter; and
    estimating the filtered disturbance $$\hat{d}_{k+1|k} = \hat{d}_{k|k-1} + L_d(y_k - C\hat{x}_{k|k-1}) \tag{5}.$$

2. The method of claim 1 wherein the determining filter gains comprises determining the filter gains offline.

3. The method of claim 1 wherein the estimating the filtered disturbance and a filtered state comprises estimating the filtered disturbance online.

4. The method of claim 1 wherein the determining a steady state target state from the filtered disturbance and a steady state target output comprises:
    determining a constrained target matrix having elements $M_{11}$, $M_{12}$, $M_{21}$, $M_{22}$, from the model factors;

determining constrained target gains $G_1$, $G_2$, and $G_3$ from the model factors and a steady state factor;

determining an unconstrained target input from the filtered disturbance and the steady state target output from $$\bar{u}^* = M_{21}\hat{d}_{k|k} + M_{22}\bar{y}. \tag{34a}$$

determining whether the unconstrained target input is on or within input constraints;

when the unconstrained target input is on or within input constraints, setting a steady state target input equal to the unconstrained target input and determining the steady state target state $$\bar{x}_k = M_{11}\hat{d}_{k|k} + M_{12}\bar{y} \tag{34c}$$

when the unconstrained target input is outside the input constraints, setting the steady state target input equal to a minimum input constraint when the steady state target input is less than the minimum input constraint, setting the steady state target input equal to a maximum input constraint when the steady state target input is greater than the maximum input constraint, and determining the steady state target state $$\bar{x}_k = G_1\hat{d}_{k|k} + G_2\bar{y} + G_3\bar{u}_k \tag{34d}.$$

5. The method of claim 4 wherein the determining a constrained target matrix and determining constrained target gains comprises determining a constrained target matrix offline and determining constrained target gains offline.

6. The method of claim 4 wherein the determining an unconstrained target input comprises determining an unconstrained target input online.

7. The method of claim 1 wherein the populating a dynamic optimization solution table comprises populating a dynamic optimization solution table offline.

8. The method of claim 1 wherein the dynamic optimization solution table is ordered.

9. The method of claim 1 wherein the determining the optimum input from the dynamic optimization solution table comprises:

determining a time varying parameter;
determining a potential optimum input from the time varying parameter; and
checking whether the potential optimum input is the optimum input.

10. The method of claim 9 further comprising determining a next potential optimum input from the time varying parameter when the potential optimum input is not the optimum input.

11. The method of claim 9 wherein the determining a time varying parameter comprises:

determining whether the steady state target output is reachable;
when the steady state target output is reachable, determining an intermediate time varying parameter $$\tilde{c} = \mathcal{B}^T \mathcal{Q} \mathcal{A} w_0 + \mathcal{D}^T \mathcal{R} \mathcal{C} v_{-1} \tag{14}$$

when the steady state target output is unreachable, determining the intermediate time varying parameter $$\tilde{c} = \mathcal{B}^T \mathcal{Q} \mathcal{A} w_0 + \mathcal{B}^T \mathcal{P} + \mathcal{D}^T \mathcal{R} \mathcal{C} v_{-1}, \tag{23}$$

and;
determining the time varying parameter $$c = \tilde{c} - H\bar{u}_k \tag{36c}.$$

12. The method of claim 9 wherein the dynamic optimization solution table comprises optimal input solution offset $B_i$ and optimal input solution gain $K_i$, and the determining a potential optimum input comprises determining $$u_i = K_i c + B_i. \tag{52a}$$

13. The method of claim 9 wherein the checking whether the potential optimum input is the optimum input comprises determining whether the potential optimum input meets a constraint condition.

14. The method of claim 9 wherein the checking whether the potential optimum input is the optimum input comprises determining whether any element of the active constraint Lagrange multiplier vector is zero or negative.

15. A system of predictive control for a single input, single output (SISO) system generating an optimum input for controlling the SISO system, comprising:

means for modeling the SISO system with model factors;
means for detecting output from the SISO system;
means for estimating a filtered disturbance from the output;
means for determining a steady state target state from the filtered disturbance and a steady state target output;
means for populating a dynamic optimization solution table using the model factors and a main tuning parameter;
means for determining the optimum input from the dynamic optimization solution table; and
means for controlling the SISO system in response to the optimum input;
wherein the means for estimating a filtered disturbance from the output comprises:
means for determining filter gains from the model factors, an estimator tuning parameter, and an output noise covariance parameter; and
means for estimating the filtered disturbance $$\hat{d}_{k|k} = \hat{d}_{k|k-1} + L_d(y_k - C\hat{x}_{k|k-1}) \tag{5}.$$

16. The system of claim 15 wherein the means for determining filter gains comprises means for determining the filter gains offline.

17. The system of claim 15 wherein the means for estimating the filtered disturbance and a filtered state comprises means for estimating the filtered disturbance online.

18. The system of claim 15 wherein the means for determining a steady state target state from the filtered disturbance and a steady state target output comprises:

means for determining a constrained target matrix having elements $M_{11}$, $M_{12}$, $M_{21}$, $M_{22}$, from the model factors;
means for determining constrained target gains $G_1$, $G_2$, and $G_3$ from the model factors and a steady state factor;
means for determining an unconstrained target input from the filtered disturbance and the steady state target output from $$\bar{u}^* = M_{21}\hat{d}_{k|k} + M_{22}\bar{y}. \tag{34a}$$

means for determining whether the unconstrained target input is on or within input constraints;
means for setting a steady state target input equal to the unconstrained target input and means for determining the steady state target state, when the unconstrained target input is on or within input constraints, from $$\bar{x}_k = M_{11}\hat{d}_{k|k} + M_{12}\bar{y} \tag{34c}$$

means for setting the steady state target input equal to a minimum input constraint when the steady state target input is less than the minimum input constraint, means for setting the steady state target input equal to a maximum input constraint when the steady state target input is greater than the maximum input constraint, and means for determining the steady state target state, when the unconstrained target input is outside the input constraints, from $$\bar{x}_k = G_1 \hat{d}_{k|k} + G_2 \bar{y} + G_3 \bar{u}_k \qquad (34d).$$

19. The system of claim 18 wherein:
the means for determining a constrained target matrix comprises means for determining a constrained target matrix offline; and
the means for determining constrained target gains comprises means for determining constrained target gains offline.

20. The system of claim 18 wherein the means for determining an unconstrained target input comprises means for determining an unconstrained target input online.

21. The system of claim 15 wherein the means for populating a dynamic optimization solution table comprises means for populating a dynamic optimization solution table offline.

22. The system of claim 15 wherein the means for populating a dynamic optimization solution table further comprises means for ordering the dynamic optimization solution table.

23. The system of claim 15 wherein the means for determining the optimum input from the dynamic optimization solution table comprises:
means for determining a time varying parameter;
means for determining a potential optimum input from the time varying parameter; and
means for checking whether the potential optimum input is the optimum input.

24. The system of claim 23 further comprising means for determining a next potential optimum input from the time varying parameter when the potential optimum input is not the optimum input.

25. The system of claim 23 wherein the means for determining a time varying parameter comprises:
means for determining whether the steady state target output is reachable;
means for determining an intermediate time varying parameter, when the steady state target output is reachable, from $$\tilde{c} = \mathcal{B}^T \mathcal{Q} \mathcal{A}_{w_0} + \mathcal{D}^T \mathcal{R} \mathcal{C} v_{-1} \qquad (14)$$

means for determining the intermediate time varying parameter, when the steady state target output is unreachable, from $$\tilde{c} = \mathcal{B}^T \mathcal{Q} \mathcal{A}_{w_0} + \mathcal{B}^T \mathcal{P} + \mathcal{D}^T \mathcal{R} \mathcal{C} v_{-1}, \qquad (23)$$

and;
means for determining the time varying parameter $$c = \tilde{c} - H \bar{u}_k \qquad (36c).$$

26. The system of claim 23 wherein the dynamic optimization solution table comprises optimal input solution offset $B_i$ and optimal input solution gain $K_i$, and the means for determining a potential optimum input comprises means for determining $$u_i = K_i c + B_i. \qquad (52a)$$

27. The system of claim 23 wherein the means for checking whether the potential optimum input is the optimum input comprises means for determining whether the potential optimum input meets a constraint condition.

28. The system of claim 23 wherein the means for checking whether the potential optimum input is the optimum input comprises means for determining whether any element of the active constraint Lagrange multiplier vector is zero or negative.

29. A computer readable medium storing a computer program for predictive control of a single input, single output (SISO) system generating an optimum input for controlling the SISO system, comprising:
computer readable code for modeling the SISO system with model factors;
computer readable code for detecting output from the SISO system;
computer readable code for estimating a filtered disturbance from the output;
computer readable code for determining a steady state target state from the filtered disturbance and a steady state target output;
computer readable code for populating a dynamic optimization solution table using the model factors and a main tuning parameter;
computer readable code for determining the optimum input from the dynamic optimization solution table; and
computer readable code for controlling the SISO system in response to the optimum input;
wherein the computer readable code for estimating a filtered disturbance from the output comprises:
computer readable code for determining filter gains from the model factors, an estimator tuning parameter, and an output noise covariance parameter; and
computer readable code for estimating the filtered disturbance $$\hat{d}_{k|k} = \hat{d}_{k|k-1} + L_d(y_k - C\hat{x}_{k|k-1}) \qquad (5).$$

30. The computer readable medium of claim 29 wherein the computer readable code for determining filter gains comprises computer readable code for determining the filter gains offline.

31. The computer readable medium of claim 29 wherein the computer readable code for estimating the filtered disturbance and a filtered state comprises computer readable code for estimating the filtered disturbance online.

32. The computer readable medium of claim 29 wherein the computer readable code for determining a steady state target state from the filtered disturbance and a steady state target output comprises:
computer readable code for determining a constrained target matrix having elements $M_{11}$, $M_{12}$, $M_{21}$, $M_{22}$, from the model factors;
computer readable code for determining constrained target gains $G_1$, $G_2$, and $G_3$ from the model factors and a steady state factor;
computer readable code for determining an unconstrained target input from the filtered disturbance and the steady state target output from $$\bar{u}^* = M_{21} \hat{d}_{k|k} + M_{22} \bar{y}. \qquad (34a)$$

computer readable code for determining whether the unconstrained target input is on or within input constraints;
computer readable code for setting a steady state target input equal to the unconstrained target input and computer readable code for determining the steady state target state, when the unconstrained target input is on or within input constraints, from $$\bar{x}_k = M_{11} \hat{d}_{k|k} + M_{12} \bar{y} \qquad (34c)$$

computer readable code for setting the steady state target input equal to a minimum input constraint when the steady state target input is less than the minimum input constraint, computer readable code for setting the steady state target input equal to a maximum input constraint when the steady state target input is greater than the maximum input constraint, and computer readable code for determining the steady state target state, when the unconstrained target input is outside the input constraints, from $$\bar{x}_k = G_1 \hat{d}_{k|k} + G_2 \bar{y} + G_3 \bar{u}_k \qquad (34d).$$

33. The computer readable medium of claim 32 wherein: the computer readable code for determining a constrained target matrix comprises computer readable code for determining a constrained target matrix offline; and the computer readable code for determining constrained target gains comprises computer readable code for determining constrained target gains offline.

34. The computer readable medium of claim 32 wherein the computer readable code for determining an unconstrained target input comprises computer readable code for determining an unconstrained target input online.

35. The computer readable medium of claim 29 wherein the computer readable code for populating a dynamic optimization solution table comprises computer readable code for populating a dynamic optimization solution table offline.

36. The computer readable medium of claim 29 wherein the computer readable code for populating a dynamic optimization solution table further comprises computer readable code for ordering the dynamic optimization solution table.

37. The computer readable medium of claim 29 wherein the computer readable code for determining the optimum input from the dynamic optimization solution table comprises:
    computer readable code for determining a time varying parameter;
    computer readable code for determining a potential optimum input from the time varying parameter; and
    computer readable code for checking whether the potential optimum input is the optimum input.

38. The computer readable medium of claim 37 further comprising computer readable code for determining a next potential optimum input from the time varying parameter when the potential optimum input is not the optimum input.

39. The computer readable medium of claim 37 wherein the computer readable code for determining a time varying parameter comprises:
    computer readable code for determining whether the steady state target output is reachable;
    computer readable code for determining an intermediate time varying parameter, when the steady state target output is reachable, from $$\tilde{c} = \mathcal{B}^T \mathcal{Q} \mathcal{A} w_0 + \mathcal{D}^T \mathcal{R} \mathcal{C} v_{-1} \qquad (14)$$

computer readable code for determining the intermediate time varying parameter, when the steady state target output is unreachable, from $$\tilde{c} = \mathcal{B}^T \mathcal{Q} \mathcal{A} w_0 + \mathcal{B}^T \mathcal{P} + \mathcal{D}^T \mathcal{R} \mathcal{C} v_{-1}, \qquad (23)$$

and;
    computer readable code for determining the time varying parameter $$c = \tilde{c} - H \bar{u}_k \qquad (36c).$$

40. The computer readable medium of claim 37 wherein the dynamic optimization solution table comprises optimal input solution offset $B_i$ and optimal input solution gain $K_i$, and the computer readable code for determining a potential optimum input comprises computer readable code for determining $$u_i = K_i c + B_i, \qquad (52a).$$

41. The computer readable medium of claim 37 wherein the computer readable code for checking whether the potential optimum input is the optimum input comprises computer readable code for determining whether the potential optimum input meets a constraint condition.

42. The computer readable medium of claim 37 wherein the computer readable code for checking whether the potential optimum input is the optimum input comprises computer readable code for determining whether any element of the active constraint Lagrange multiplier vector is zero or negative.

43. A method of predictive control for a single input, single output (SISO) system generating an optimum input for controlling the SISO system, comprising:
    modeling the SISO system with model factors;
    detecting output from the SISO system;
    estimating a filtered disturbance from the output;
    determining a steady state target state from the filtered disturbance and a steady state target output;
    populating a dynamic optimization solution table using the model factors and a main tuning parameter;
    determining the optimum input from the dynamic optimization solution table; and
    controlling the SISO system in response to the optimum input;
    wherein the determining a steady state target state from the filtered disturbance and a steady state target output comprises:
    determining a constrained target matrix having elements $M_{11}$, $M_{12}$, $M_{21}$, $M_{22}$, from the model factors;
    determining constrained target gains $G_1$, $G_2$, and $G_3$ from the model factors and a steady state factor;
    determining an unconstrained target input from the filtered disturbance and the steady state target output from $$\bar{u}^* = M_{21} \hat{d}_{k|k} + M_{22} \bar{y}. \qquad (34a)$$

determining whether the unconstrained target input is on or within input constraints;
    when the unconstrained target input is on or within input constraints, setting a steady state target input equal to the unconstrained target input and determining the steady state target state $$\bar{x}_k = M_{11} \hat{d}_{k|k} + M_{12} \bar{y} \qquad (34c)$$

when the unconstrained target input is outside the input constraints, setting the steady state target input equal to a minimum input constraint when the steady state target input is less than the minimum input constraint, setting the steady state target input equal to a maximum input constraint when the steady state target input is greater than the maximum input constraint, and determining the steady state target state $$\bar{x}_k = G_1 \hat{d}_{k|k} + G_2 \bar{y} + G_3 \bar{u}_k \qquad (34d).$$

44. The method of claim 43 wherein the determining a constrained target matrix and determining constrained target gains comprises determining a constrained target matrix offline and determining constrained target gains offline.

45. The method of claim 43 wherein the determining an unconstrained target input comprises determining an unconstrained target input online.

46. A method of predictive control for a single input, single output (SISO) system generating an optimum input for controlling the SISO system, comprising:
   modeling the SISO system with model factors;
   detecting output from the SISO system;
   estimating a filtered disturbance from the output;
   determining a steady state target state from the filtered disturbance and a steady state target output;
   populating a dynamic optimization solution table using the model factors and a main tuning parameter;
   determining the optimum input from the dynamic optimization solution table; and
   controlling the SISO system in response to the optimum input;
   wherein the determining the optimum input from the dynamic optimization solution table comprises:
   determining a time varying parameter;
   determining a potential optimum input from the time varying parameter; and
   checking whether the potential optimum input is the optimum input; and
   wherein the determining a time varying parameter comprises:
   determining whether the steady state target output is reachable;
   when the steady state target output is reachable, determining an intermediate time varying parameter $$\tilde{c} = \mathcal{B}^T \mathcal{Q} \mathcal{A} w_0 + \mathcal{D}^T \mathcal{R} \mathcal{C} v_{-1} \quad (14);$$

when the steady state target output is unreachable, determining the intermediate time varying parameter $$\tilde{c} = \mathcal{B}^T \mathcal{Q} \mathcal{A} w_0 + \mathcal{B}^T \mathcal{P} + \mathcal{D}^T \mathcal{R} \mathcal{C} v_{-1}, \quad (23)$$

and;
   determining the time varying parameter $$c = \tilde{c} - H \bar{u}_k \quad (36c).$$

47. A method of predictive control for a single input, single output (SISO) system generating an optimum input for controlling the SISO system, comprising:
   modeling the SISO system with model factors;
   detecting output from the SISO system;
   estimating a filtered disturbance from the output;
   determining a steady state target state from the filtered disturbance and a steady state target output;
   populating a dynamic optimization solution table using the model factors and a main tuning parameter;
   determining the optimum input from the dynamic optimization solution table; and
   controlling the SISO system in response to the optimum input;
   wherein the determining the optimum input from the dynamic optimization solution table comprises:
   determining a time varying parameter;
   determining a potential optimum input from the time varying parameter; and
   checking whether the potential optimum input is the optimum input; and
   wherein the dynamic optimization solution table comprises optimal input solution offset $B_i$ and optimal input solution gain $K_i$, and the determining a potential optimum input comprises determining $$u_i = K_i c + B_i. \quad (52a).$$

48. A system of predictive control for a single input, single output (SISO) system generating an optimum input for controlling the SISO system, comprising:
   means for modeling the SISO system with model factors;
   means for detecting output from the SISO system;
   means for estimating a filtered disturbance from the output;
   means for determining a steady state target state from the filtered disturbance and a steady state target output;
   means for populating a dynamic optimization solution table using the model factors and a main tuning parameter;
   means for determining the optimum input from the dynamic optimization solution table; and
   means for controlling the SISO system in response to the optimum input;
   wherein the means for determining a steady state target state from the filtered disturbance and a steady state target output comprises:
   means for determining a constrained target matrix having elements $M_{11}$, $M_{12}$, $M_{21}$, $M_{22}$, from the model factors;
   means for determining constrained target gains $G_1$, $G_2$, and $G_3$ from the model factors and a steady state factor;
   means for determining an unconstrained target input from the filtered disturbance and the steady state target output from $$\bar{u}^* = M_{21} \bar{d}_{k|k} + M_{22} \bar{y}. \quad (34a)$$

means for determining whether the unconstrained target input is on or within input constraints;
   means for setting a steady state target input equal to the unconstrained target input and means for determining the steady state target state, when the unconstrained target input is on or within input constraints, from $$\bar{x}_k = M_{11} \bar{d}_{k|k} + M_{12} \bar{y} \quad (34c)$$

means for setting the steady state target input equal to a minimum input constraint when the steady state target input is less than the minimum input constraint, means for setting the steady state target input equal to a maximum input constraint when the steady state target input is greater than the maximum input constraint, and means for determining the steady state target state, when the unconstrained target input is outside the input constraints, from $$\bar{x}_k = G_1 \bar{d}_{k|k} + G_2 \bar{y} + G_3 \bar{u}_k \quad (34d).$$

49. The system of claim 48 wherein:
   the means for determining a constrained target matrix comprises means for determining a constrained target matrix offline; and
   the means for determining constrained target gains comprises means for determining constrained target gains offline.

50. The system of claim 48 wherein the means for determining an unconstrained target input comprises means for determining an unconstrained target input online.

51. A system of predictive control for a single input, single output (SISO) system generating an optimum input for controlling the SISO system, comprising:
   means for modeling the SISO system with model factors;
   means for detecting output from the SISO system;
   means for estimating a filtered disturbance from the output;
   means for determining a steady state target state from the filtered disturbance and a steady state target output;
   means for populating a dynamic optimization solution table using the model factors and a main tuning parameter;
   means for determining the optimum input from the dynamic optimization solution table; and means for controlling the SISO system in response to the optimum input;
wherein the means for determining the optimum input from the dynamic optimization solution table comprises:
means for determining a time varying parameter;
means for determining a potential optimum input from the time varying parameter; and
means for checking whether the potential optimum input is the optimum input; and
wherein the means for determining a time varying parameter comprises:
means for determining whether the steady state target output is reachable;
means for determining an intermediate time varying parameter, when the steady state target output is reachable, from $$\tilde{c} = \mathcal{B}^T \mathcal{Q} \mathcal{A} w_0 + \mathcal{D}^T \mathcal{R} \mathcal{C} v_{-1} \quad (14);$$

means for determining the intermediate time varying parameter, when the steady state target output is unreachable, from $$\tilde{c} = \mathcal{B}^T \mathcal{Q} \mathcal{A} w_0 + \mathcal{B}^T \mathcal{P} + \mathcal{D}^T \mathcal{R} \mathcal{C} v_{-1}, \quad (23)$$

and;
means for determining the time varying parameter $$c = \tilde{c} - H\overline{u}_k \quad (36c).$$

52. A system of predictive control for a single input, single output (SISO) system generating an optimum input for controlling the SISO system, comprising:
means for modeling the SISO system with model factors;
means for detecting output from the SISO system;
means for estimating a filtered disturbance from the output;
means for determining a steady state target state from the filtered disturbance and a steady state target output;
means for populating a dynamic optimization solution table using the model factors and a main tuning parameter;
means for determining the optimum input from the dynamic optimization solution table; and
means for controlling the SISO system in response to the optimum input;
wherein the means for determining the optimum input from the dynamic optimization solution table comprises:
means for determining a time varying parameter;
means for determining a potential optimum input from the time varying parameter; and
means for checking whether the potential optimum input is the optimum input; and
wherein the dynamic optimization solution table comprises optimal input solution offset $B_i$ and optimal input solution gain $K_i$, and the means for determining a potential optimum input comprises means for determining $$u_i = K_i c + B_i. \quad (52a).$$

53. A computer readable medium storing a computer program for predictive control of a single input, single output (SISO) system generating an optimum input for controlling the SISO system, comprising:
computer readable code for modeling the SISO system with model factors;
computer readable code for detecting output from the SISO system;
computer readable code for estimating a filtered disturbance from the output;
computer readable code for determining a steady state target state from the filtered disturbance and a steady state target output;
computer readable code for populating a dynamic optimization solution table using the model factors and a main tuning parameter;
computer readable code for determining the optimum input from the dynamic optimization solution table; and
computer readable code for controlling the SISO system in response to the optimum input;
wherein the computer readable code for determining a steady state target state from the filtered disturbance and a steady state target output comprises:
computer readable code for determining a constrained target matrix having elements $M_{11}$, $M_{12}$, $M_{21}$, $M_{22}$, from the model factors;
computer readable code for determining constrained target gains $G_1$, $G_2$, and $G_3$ from the model factors and a steady state factor;
computer readable code for determining an unconstrained target input from the filtered disturbance and the steady state target output from $$\overline{u}^* = M_{21} d_{k|k} + M_{22} \overline{y}. \quad (34a)$$

computer readable code for determining whether the unconstrained target input is on or within input constraints;
computer readable code for setting a steady state target input equal to the unconstrained target input and computer readable code for determining the steady state target state, when the unconstrained target input is on or within input constraints, from $$\overline{x}_k = M_{11} d_{k|k} + M_{12} \overline{y} \quad (34c)$$

computer readable code for setting the steady state target input equal to a minimum input constraint when the steady state target input is less than the minimum input constraint, computer readable code for setting the steady state target input equal to a maximum input constraint when the steady state target input is greater than the maximum input constraint, and computer readable code for determining the steady state target state, when the unconstrained target input is outside the input constraints, from $$\overline{x}_k = G_1 d_{k|k} + G_2 \overline{y} + G_3 \overline{u}_k \quad (34d).$$

54. The computer readable medium of claim 53 wherein:
the computer readable code for determining a constrained target matrix comprises computer readable code for determining a constrained target matrix offline; and
the computer readable code for determining constrained target gains comprises computer readable code for determining constrained target gains offline.

55. The computer readable medium of claim 53 wherein the computer readable code for determining an unconstrained target input comprises computer readable code for determining an unconstrained target input online.

56. A computer readable medium storing a computer program for predictive control of a single input, single output (SISO) system generating an optimum input for controlling the SISO system, comprising:
computer readable code for modeling the SISO system with model factors;
computer readable code for detecting output from the SISO system;
computer readable code for estimating a filtered disturbance from the output;

computer readable code for determining a steady state target state from the filtered disturbance and a steady state target output;

computer readable code for populating a dynamic optimization solution table using the model factors and a main tuning parameter;

computer readable code for determining the optimum input from the dynamic optimization solution table; and computer readable code for controlling the SISO system in response to the optimum input;

wherein the computer readable code for determining the optimum input from the dynamic optimization solution table comprises:

computer readable code for determining a time varying parameter;

computer readable code for determining a potential optimum input from the time varying parameter; and computer readable code for checking whether the potential optimum input is the optimum input; and wherein the computer readable code for determining a time varying parameter comprises:

computer readable code for determining whether the steady state target output is reachable;

computer readable code for determining an intermediate time varying parameter, when the steady state target output is reachable, from $$\tilde{c} = \mathcal{B}^T \mathcal{Q} \mathcal{A}_{w_0} + \mathcal{D}^T \mathcal{R} \mathcal{C}_{v_{-1}} \quad (14);$$

computer readable code for determining the intermediate time varying parameter, when the steady state target output is unreachable, from $$\tilde{c} = \mathcal{B}^T \mathcal{Q} \mathcal{A}_{w_0} + \mathcal{B}^T \mathcal{P} + \mathcal{D}^T \mathcal{R} \mathcal{C}_{v_{-1}}, \quad (23)$$

and;

computer readable code for determining the time varying parameter $$c = \tilde{c} - \overline{Hu}_k \quad (36c).$$

57. A computer readable medium storing a computer program for predictive control of a single input, single output (SISO) system generating an optimum input for controlling the SISO system, comprising:

computer readable code for modeling the SISO system with model factors;

computer readable code for detecting output from the SISO system;

computer readable code for estimating a filtered disturbance from the output;

computer readable code for determining a steady state target state from the filtered disturbance and a steady state target output;

computer readable code for populating a dynamic optimization solution table using the model factors and a main tuning parameter;

computer readable code for determining the optimum input from the dynamic optimization solution table; and computer readable code for controlling the SISO system in response to the optimum input;

wherein the computer readable code for determining the optimum input from the dynamic optimization solution table comprises:

computer readable code for determining a time varying parameter;

computer readable code for determining a potential optimum input from the time varying parameter; and computer readable code for checking whether the potential optimum input is the optimum input; and wherein the dynamic optimization solution table comprises optimal input solution offset $B_i$ and optimal input solution gain $K_i$, and the computer readable code for determining a potential optimum input comprises computer readable code for determining $$u_i = K_i c + B_i. \quad (52a).$$

* * * * *